United States Patent Office — 3,641,092, Patented Feb. 8, 1972

3,641,092
ISOCYANATE SYNTHESIS FROM AMINES AND CARBON MONOXIDE CATALYZED BY PdCl$_2$
Patrick M. Henry, McDaniel Crest, Wilmington, Del., assignor to Hercules Incorporated, Wilmington, Del.
No Drawing. Filed Nov. 25, 1966, Ser. No. 596,799
Int. Cl. C07c *119/04*
U.S. Cl. 260—453 PC     6 Claims

ABSTRACT OF THE DISCLOSURE

The —NH$_2$ group in an organic amine is converted into a —NCO group by reacting the organic amine with CO in contact with palladium chloride.

---

This invention relates to the production of monomeric and polymeric organic isocyanates.

In accordance with the present invention, it has been found that an organic isocyanate or polymer thereof is produced by contacting an organic primary amine with carbon monoxide in a nonaqueous medium in the presence of palladium dichloride.

The process may be represented by the following equation:

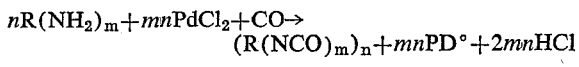

$$nR(NH_2)_m + mn PdCl_2 + CO \rightarrow (R(NCO)_m)_n + mn Pd° + 2mn HCl$$

where R is a hydrocarbon radical and $m$ and $n$ are whole numbers from 1 to 3, the number of monomeric units in the product being indicated by $n$. The process takes place at a temperature in the range of 0 to 300° C., preferably 25–100° C.

The palladium may be recovered and converted to palladium dichloride, or it may be regenerated in a redox system so as to make the reaction catalytic with respect to palladium chloride.

The organic amines to which the process of this invention are applicable are the hydrocarbon primary amines. Aliphatic amines, alicyclic amines and aromatic amines are operable. These amines include those amines of the formula RNH$_2$ where R is benzyl, methyl, ethyl, propyl, butyl, and similar aliphatic and mixed aliphatic-aromatic radicals of 1–20 carbons; where R is cyclohexyl, cyclopentyl, cyclobutyl, hydroabietyl, tetrahydronaphthyl, hexahydronaphthyl, and similar alicyclic radicals; and where R is phenyl, tolyl, xylyl, naphthyl, tetrahydronaphthyl, and similar aromatic radicals. The amines of the formula R(NH$_2$)$_m$ are aliphatic, alicyclic, and aromatic amines. The aliphatic diamines include ethylene diamine, hexamethylene diamine and other homologs and isomers of 2 to 10 carbons. The aromatic diamines include phenylene diamine, tolylene diamine, and naphthylene diamine. Phenylene triamine also is operable.

The reaction in an inert medium may be carried out in liquid or gaseous phase for production of the isocyanate. When carried out in the gaseous phase, the amine vapor in carbon monoxide gas is passed over a supported catalyst such as pumice coated with or impregnated with PdCl$_2$. The palladium on the pumice may be regenerated. On the other hand, the pumice may be coated with CuCl$_2$ and PdCl$_2$ so that the catalyst can be regenerated by reaction with oxygen. This may be effected as a separate step or in situ.

The process is preferably carried out in a solvent which acts as a carrier or diluent such as acetonitrile, benzene, toluene, dimethylsulfoxide, 1,2-dimethoxyethane or tetrahydrofuran. Solvents with an active hydrogen such as water, alcohols, organic acids, and amines produce a secondary reaction product from the isocyanate. The solvent used need not be a solvent for all reagents or all of the products. Diluents serve a useful purpose in reducing the concentration of the amine so as to prevent reaction between amine and isocyanate. Due to variable reactivity of various amines, there is no critical concentration that can be specified. If there occurs too much reaction between the isocyanate and amine, the amine can be introduced gradually to the reaction system in addition to using more diluent or solvent to reduce the secondary reaction. When metals which complex with amines are present, the complex serves a role of gradually releasing amine to the reaction system. Since these various factors all contribute to the secondary reaction to produce a urea, the best conditions for any system are readily worked out experimentally. When working with a liquid phase reaction system, a solvent is particualrly desirable.

The carbon monoxide is used in excess of the theoretical so as to increase the rate of reaction. The amount of excess carbon monoxide is at least 100% excess. The reaction is carried out under pressure so as to maintain this excess. Pressures in the range of 15 to 5000 p.s.i. are used and pressures in the range of 15 to 1000 p.s.i. are preferred.

The process of this invention is illustrated by the following examples:

EXAMPLE 1

To 25 ml. of 0.2 M PdCl$_2$ in CH$_3$CN was added 20 mmoles aniline and 1.4 g. Na$_2$HPO$_4$, and the mixture was placed under atmospheric carbon monoxide pressure. After agitating 21 hours at 25° C. 3.4 mmoles CO was absorbed. Infrared absorption analysis showed the resulting solution to be 0.025 molar in phenylisocyanate.

EXAMPLE 2

To 20 ml. 0.1 M Li$_2$PdCl$_4$ in CH$_3$CN was added carbon monoxide to a pressure of 5 p.s.i.g. at 25° C. After about 3 hours the solution had turned from its initial red color to orange. A 0.18 ml. portion of aniline was then added and a yellow precipitate separated from the orange solution. Then a 0.96 ml. portion of dicyclohexylethylamine was added. This caused the red color to deepen and on heating at 80° C. caused precipitation of metal in finely divided black form. Infrared analysis showed the solution to be 0.017 M in phenylisocyanate and trimer of phenylisocyanate to also be present.

EXAMPLE 3

When Example 2 was repeated using 0.568 g. Na$_2$HPO$_4$ in place of dicyclohexylethylamine, the resulting solution was 0.034 in phenylisocyanate and the trimer was absent.

EXAMPLE 4

To 10 ml. 0.1 M PdCl$_2$ in CH$_3$CN was added 25 ml. dry CH$_3$CN, 1.67 g. (12.5 mmoles) CuCl$_2$ and 1.77 g. (12.5 mmoles) Na$_2$HPO$_4$. Then 0.57 ml. (6.3 mmoles) aniline was added. This mixture was placed under an atmosphere of carbon monoxide at 25° C., and the rate of absorption of CO was measured. After 4 hours the absorption stopped at 5.7 mmoles uptake. Infrared analysis showed a concentration of 0.043 M phenylisocyanate (1.07 mmoles). Cupric analysis showed that 80–90% of the cupric chloride had been reduced to cuprous chloride.

EXAMPLE 5

A mixture of 20 ml. 0.1 M PdCl$_2$ solution in CH$_3$CN diluted to 100 ml. with dry CH$_3$CN, 6.7 g. (50 mmoles) CuCl$_2$ and 7.1 g. (50 mmoles) Na$_2$HPO$_4$ was placed in a 750 ml. pressure bottle and pressured to 5 p.s.i.g. with CH$_3$NH$_2$. The solution turned blue and the pressure dropped to 1.5 p.s.i.g. on agitation. To this solution was then added CO up to a pressure of 10 p.s.i.g. The solution under pressure was then heated at 80° C. for 1 hour. The run was terminated when palladium metal precipitated. The mixture on analysis by infrared was shown to be 0.018 M in methylisocyanate. Some dimethyl urea was also detected.

EXAMPLE 6

A solid catalyst was prepared from 268 g. pumice, 94 g. $CuCl_2$ and 7 mmoles $PdCl_2$ in 450 ml. $CH_3CN$. The $CH_3CN$ was distilled off, 250 ml. methanol was added, and it was distilled off in vacuo. To this catalyst was added 20 g. methylamine and while at 100° C., CO was added up to 100 p.s.i.g. The reaction vessel was then cooled and extracted with methylene chloride and the extracted material was recovered. It melted at 173.0–173.1° C. and was shown by infrared analysis to be methylisocyanate trimer. Its yield was 0.193 mole. The amount of copper reduced was 0.4 mole out of the 0.7 mole introduced.

EXAMPLE 7

In a pressure vessel was placed 2.82 g. $Na_2HPO_4$ and 100 ml. 0.1 M $PdCl_2$ in dry acetonitrile. The pressure vessel was filled with CO to a pressure of 10 p.s.i.g. Then 0.75 ml. ethylamine was introduced under pressure. The reaction vessel was heated to 85° C. for 1 hour. A 0.2 ml. portion of ethylamine was introduced and heating at 85° C. was continued for another hour. The product recovered was analyzed by infrared to show the production of 0.035 M ethylisocyanate which was further identified by reaction with aniline to give phenylethyl urea.

EXAMPLE 8

In a pressure bottle was placed 7.1 g. $Na_2HPO_4$, 6.7 g. $CuCl_2$ and 100 ml. 0.04 M $PdCl_2$ in dry acetonitrile. The air was displaced by CO and CO introduced to 12 p.s.i.g. pressure. Then 1.6 ml. ethylamine was introduced under pressure, and the mixture was heated at 80° C. for 3 hours. A second portion of 1.0 ml. ethylamine was added, and heating at 80° C. was continued for another 2 hours. The contents analyzed 0.07 M ethylisocyanate by infrared.

EXAMPLE 9

A pressure bottle was charged with 20 ml. 0.1 M $PdCl_2$ in dry acetonitrile and CO to 5 p.s.i.g. Then 0.23 ml. (2 mmoles) cyclohexylamine was introduced under pressure. A thick slurry formed. This was heated at 100° C. for 3 hours. Infrared analysis showed 0.03 M cyclohexylisocyanate.

EXAMPLE 10

A pressure bottle was charged with 25 ml. 0.04 M $PdCl_2$ in acetonitrile, 1.34 g. $CuCl_2$ (10 mmoles) and 1.42 g. $Na_2HPO_4$ (10 mmoles) and CO to 5 p.s.i.g. pressure and 0.92 ml. cyclohexylamine (4 mmoles) was added under pressure. After heating 4 hours at 85° C., the resulting mixture analyzed by infrared 0.03 M cyclohexylisocyanate.

EXAMPLE 11

A pressure bottle was charged with 2.82 g. $Na_2HPO_4$, 100 ml. 0.1 M $PdCl_2$ in acetonitrile and CO to 5 p.s.i.g. Then 0.61 g. 2,4-diaminotoluene was added under pressure and the mixture was heated at 85° C. for 3 hours. By analysis the resulting mixture corresponded to 0.01 M 2,4-toluenediisocyanate.

EXAMPLE 12

A pressure bottle was charged with 7.1 g. $Na_2HPO_4$ (50 mmoles), 6.7 g. $CuCl_2$ (50 mmoles), 100 ml. 0.04 M $PdCl_2$ in acetonitrile and 1.52 g. (12.5 mmoles) 2,4-diaminotoluene and mixed, and CO was added to 10 p.s.i.g. The reaction mixture was heated at 85° C. for 3 hours. By infrared analysis the reaction mixture corresponded to 0.022 M in 2,4-toluenediisocyanate.

EXAMPLE 13

Example 12 was repeated with 2,6-diaminotoluene in place of 2,4-diaminotoluene with similar results in the production of 2,6-toluenediisocyanate.

EXAMPLE 14

Fifty (50) ml. of a methanol solution which was 0.01 M $PdCl_2$, 0.26 M $CH_3NH_2$, 0.4 M $CuCl_2$ and contained 2.82 g. (20 mmoles) $Na_2HPO_4$ was stirred under atmospheric CO pressure for 20 hours. The final reaction mixture was 0.071 M in methyl urethane and 0.0054 M in dimethylcarbonate.

EXAMPLE 15

Twenty-five (25) ml. 0.1 M $PdCl_2$ in $CH_3CN$ 0.7 g. (5 mmoles) $Na_2HPO_4$ and 0.23 ml. (2.5 mmoles) aniline were mixed and stirred under atmospheric CO pressure for 24 hours. A total of 2.7 mmoles of CO was taken up. The phenylisocyanate concentration was 0.05 M.

EXAMPLE 16

Seventy-five (75) ml. 0.2 M $PdCl_2$ in $CH_3CN$ and 2.13 g. (15 mmoles) $Na_2HPO_4$ were mixed and stirred under atmospheric CO pressure. The solution turned from a deep red to a light red. Then a 0.7 ml. (7.5 mmoles) aniline was added and the reaction mixture heated at 80° C. for 3 hours. Infrared analysis indicated the solution was 0.024 M in phenylisocyanate.

EXAMPLE 17

Twenty-five (25) ml. 0.04 M $PdCl_2$ in $CH_3CN$ was mixed with 1.42 g. (10 mmoles) $Na_2HPO_4$, 1.0 ml. (10.8 mmoles) aniline and 1.34 g. (10 mmoles) $CuCl_2$. The mixture was heated under 10 p.s.i.g. CO pressure at 85° C. for 4 hours. Infrared analysis indicated the solution was 0.034 M in phenylisocyanate. Some pehnylisocyanate trimer was also present.

What I claim and desire to protect by Letters Patent is:
1. A method for producing isocyanates which comprises reacting a primary amine selected from the group consisting of a saturated aliphatic primary amine and an aromatically unsaturated primary amine, with carbon monoxide and palladium dichloride at a temperature within the range of between about 32° F. and about 500° F. and in the presence of cupric chloride as the oxidizing agent for maintaining palladium in a positive valence state.
2. The method of claim 1 in which the primary amine is methylamine.
3. The method of claim 1 in which the primary amine is ethylamine.
4. The method of claim 1 in which the primary amine is aniline.
5. The method of claim 1 in which the primary amine is 2,4-diaminotoluene.
6. The method of claim 1 in which the primary amine is 2,6-diaminotoluene.

References Cited

UNITED STATES PATENTS 3,405,156   10/1968   Stern et al. ———————— 260—453

FOREIGN PATENTS 1,025,436   4/1966   Great Britain.

OTHER REFERENCES

Stern et al., J. Org. Chem., vol. 31, pp. 596–7, February 1966.

ALEX MAZEL, Primary Examiner

D. H. TORRENCE, Assistant Examiner

U.S. Cl. X.R.

252—416, 441; 260—248 NS, 482 C, 553 R